3,291,702
ENZYMATIC CONVERSION OF STARCH CONTAINING PROTEINACEOUS SUBSTANCES TO DEXTROSE
Guido M. Miescher, Terre Haute, Ind., assignor to Commercial Solvents Corporation, a corporation of Maryland
No Drawing. Filed Apr. 13, 1964, Ser. No. 359,452
5 Claims. (Cl. 195—31)

The present invention is related to the enzymatic conversion of starch to glucose and more specifically to a process which renders the glucose-containing enzymolysate from the enzymatic conversion more easily filterable.

The production of glucose by enzymatic conversion of protein-containing starch sources can be effected using a process which in brief involves liquefying or thinning the starch material with a thinning enzyme such as one having alpha-amylase activity and thereafter treating the resulting mixture with an enzyme having amyloglucosidase activity to obtain the desired glucose solution. The resulting enzymolysate from this process contains an amount of insoluble proteinaceous and fibrous substances which must be removed by filtration or centrifuge, etc., of a clear glucose solution is to be obtained. Unfortunately, filtration of the enzymolysate is generally effected with considerable difficulty, usually warranting the use of a filter aid. The use of protein-containing starch or starch source utilized as the starting material in the enzymolysis is particularly desirable due to its low cost but it virtually always contains sufficient concentrations of the proteinaceous materials and fibers to provide the filtration problem. Thus, it has been found in general that the more impure, i.e. protein-containing the starch source, the more difficult the filtration after the enzymatic conversion.

It has now been surprisingly found that filtration of the enzymolysate resulting from the enzymatic conversion of starch contaminated with proteinaceous materials and fibers can be greatly facilitated by heating the starch source prior to the enzymatic conversion at a temperature generally of about 110° to 130° C. for at least about 0.5 hour, e.g. from about 0.5 to 50 hours. The length of time the starch source is heated is dependent on the temperature employed and the effectiveness of the heating from the standpoint of quick and even heat distribution. Ordinarily, when a temperature of about 110° C. is used a heating period of about 24 hours is satisfactory. The same effect can be obtained in about 3 hours at about 120° C. or 0.5 hours at 130° C. provided the heat is quickly and evenly distributed.

Just how the heating step of the invention accomplishes the improvement in filtration has not as yet been determined. It is though, however, that the heating may cause some denaturing of the proteinaceous substances or perhaps have some coagulation effect that facilitates filtration. Whatever the explanation, filtration of the enzymolysate is improved to such an extent that no filter aid is required at all. Even the enzymolysates, prepared by the enzymatic conversion of whole ground corn, which were very difficult to filter, filter very readily without the addition of filter aid.

The starch material subjected to the heating step of the present invention can be any starch or starch source which contains proteinaceous substances as contaminants in concentrations which make filtering of the enzymolysate from the enzymatic conversion of the starch difficult. In general, the starch material will contain at least about 3% and up to about 15%, usually about 5 to 10% by weight proteins (on a dry basis).

Thus, the starch materials to which the present invention is applicable include those of the intermediate or fair purity such as the dry milled starches as well as the relatively impure starch sources such as whole ground corn, wheat, milo, etc. Dry milled corn starch can be prepared by cleaning the corn and then while agitating it in a suitable container, spraying it with water or treating it with steam to temper the corn, i.e. to raise its moisture content to 20% or thereabouts and soften the hull; after which is is passed to a degerminating machine to produce a germ fraction and a corn fraction containing protein. The corn fraction is separated and recovered from the germ fraction and the corn fraction, i.e. the dry milled corn starch, is used in the process of the present invention.

Conversion of the starch material to glucose after the heat treatment step, is achieved by an enzymatic process which comprises heating with an enzyme having alpha-amylase activity to thin or reduce the viscosity of, and dextrinize, the starch and the resulting mixture containing dextrins and other polysaccharides is treated with an enzyme having amyloglucosidase activity to convert and saccharify the mixture to produce a glucose solution. Enzymes having alpha-amylase activity employed as the thinning enzyme in the first step of the conversion are ordinarily of the thermostable variety and include enzymes derived from cereal, animal or microbiological sources, for instance, those enzymes having alpha-amylase activity obtained from barley, malt, animal pancreas and some strains of the microorganism Bacillus subtilis. Enzymes having amyloglucosidase activity, employed in the second step of the conversion, include, for example, cultures or culture filtrates of Aspergillus phoenicis, Aspergillus usami, Aspergillus niger, Rhizopus niveus, Rhizopus japonicus, and the like. Particularly suitable cultures include Aspergillus niger NRRL–330 and NRRL–337. They can be used in purified form or as the whole culture or filtrates therefrom. If the highest purity dextrose is desired in the final solution, it is advantageous to use a purified enzyme preparation.

In the first step of the enzymatic conversion process an enzyme having alpha-amylase activity is added to an aqueous slurry of protein-containing starch, which slurry generally contains about 5 to 45%, usually about 10 to 35%, starch. The slurry is generally heated at as high a temperature as possible without excessive destroying of the alpha-amylase activity and for a time sufficient to thin or dextrinize the starch. The heating is usually conducted by heating the enzyme-containing aqueous starch mixture, generally having a normal pH of about 5.5 to 7.0, at a temperature generally of about 65 to 95° C. Preferably the temperature is raised uniformly first up to about 65 to 72° C. and then up to about 80 to 90° C., usually about 85° C., over a period generally of about 20 minutes to 90 minutes. Thickening with an increase in viscosity occurs at about 70 to 75° C. and then the slurry begins to thin. The temperature can be maintained at about 80 to 85 or 90° C. until the slurry is properly thinned and this will generally take from about 5 to 60, usually about 10 to 40 minutes. If desired, the action of the alpha-amylase can be continued to partially hydrolyze the starch.

This step of thinning starch with alpha-amylase is preferably conducted at a pH of about 5.8 to 6.5. The slurry is cooled, preferably with agitation, to a temperature generally below about 65° C., e.g. to a temperature between about 50 and 65° C. over a period generally of about 5 to 60 minutes, usually about 10 to 20 minutes. Its pH is adjusted, e.g. with a mineral acid such as sulfuric acid, to a pH generally from about 4.0 to 5.5, preferably 4.5 to 5.0.

An enzyme having amyloglucosidase activity is added to the slurry to contact the ingredients of the slurry at saccharification temperatures, generally from about 50 to 65° C., for a time sufficient to advantageously obtain a dextrose solution in which the actual glucose as determined by the glucose-oxidase method is at least 90 percent, preferably at least about 95 percent, of the value of the reducing sugar calculated as glucose determined by standard reducing sugar methods. The conversion or saccharification time will vary depending on the enzyme preparation selected and its strength of potency, but is ordinarily about 1 to 4 days.

The following examples are included to further illustrate the present invention.

Example I 3879.1 grams of finely ground #2 whole corn was placed in an electrically heated oven set to reach a temperature of 100° C. to 120° C. It required about 4 to 5 hours for the temperature to reach 100° C. The whole corn remained in the oven for a total of approximately 20 hours. At the end of that time the temperature reached about 114° C. and the electricity was turned off. The temperature immediately started to drop.

Two days later the corn was placed in 9300 ml. of water at 42° C. with quite vigorous agitation. This water also contained 40 grams of Ribberellin malt for its liquefaction activity. The malt had a high alpha-amylase activity. The material was gradually heated up to 85° C. with constant agitation. The pH after meal was added was 5.5. It was adjusted to 5.9. After the material became homogeneous it was cooled to 60° C. and the pH adjusted to 4.5 with conc. $H_2SO_4$. To this was added 400 ml. of *Aspergillus niger* culture with a high enzymatic conversion activity. It remained there about 66 hours at a temperature of 60° C. wtih only a small amount of air agitation. The volume was about 11,650 ml. then. This amount was divided into 6 ten inch Buchner funnels for filtration with no filter aid added and vacuum was applied. After 5 minutes a comparatively dry cake had formed over the filter paper. A total of 6000 ml. of wash water was used to wash the sugar out of the cake. After 45 minutes the filtration was finished.

Example II

Example I was reepated except that the whole corn was not subjected to the heat step prior to the enzymatic conversion. After 120 minutes, a dry cake still had not formed.

It is claimed:

1. In the enzymatic conversion of starch containing proteinaceous substances to glucose wherein an aqueous slurry of the starch is heated with an enzyme having alpha-amylase activity to thin the starch, the resulting mixture heated with an enzyme having amyloglucosidase activity to convert and saccharify the thinned slurry to produce an enzymolysate of glucose and the enzymolysate filtered and wherein the proteinaceous substances in the starch are present as contaminants in concentrations which make filtering of the enzymolysate difficult, the improvement which comprises heating said starch before formation of said aqueous slurry and prior to both enzymatic conversions at a temperature of about 110° to 130° C. for at least about 0.5 hour to facilitate said filtering.

2. The improvement of claim 1 wherein the heating is conducted at 110° C. for about 24 hours.

3. The improvement of claim 1 wherein the heating is conducted at 120° C. for about 3 hours.

4. The improvement of claim 1 wherein the heating is conducted at 130° C. for about 0.5 hour.

5. The process of claim 1 wherein the starch source is whole ground corn.

References Cited by the Examiner
UNITED STATES PATENTS

| | | | |
|---|---|---|---|
| 2,342,330 | 2/1944 | Christensen | 195—17 |
| 3,039,935 | 6/1962 | Rentshler et al. | 195—11 |
| 3,039,936 | 6/1962 | Lenney | 195—11 |

A. LOUIS MONACELL, *Primary Examiner.*

ALVIN E. TANENHOLTZ, *Examiner.*